Sept. 16, 1930.

W. E. WINE

HOPPER CAR DOOR FRAME

Re. 17,806

Original Filed Nov. 6, 1926

Inventor

By William E. Wine

Fuller & Mechlin his Attorneys

Reissued Sept. 16, 1930 Re. 17,806

UNITED STATES PATENT OFFICE

WILLIAM E. WINE, OF TOLEDO, OHIO, ASSIGNOR TO WINE RAILWAY APPLIANCE COMPANY, OF TOLEDO, OHIO, A CORPORATION OF OHIO

HOPPER-CAR-DOOR FRAME

Original No. 1,686,591, dated October 9, 1928, Serial No. 146,716, filed November 6, 1926. Application for reissue filed July 26, 1930. Serial No. 471,046.

My invention relates to a hopper car door frame for application to railway cars of the hopper type, and has for its object to provide a strong and simple frame unit serving to strengthen the hopper and ensure efficient performance by the door of its duty of preventing loss of lading.

A primary feature of the invention consists in forming a hopper car door frame with door seat portions which border the sides and lower edge of the lading discharge opening thereof, the said frame being formed with flanges projecting outwardly from the door seat portions in spaced relation to said opening, the flanges being adapted to cooperate with portions of the door associated with the frame to prevent the escape of lading from the hopper.

A further feature of the invention consists in providing the hopper door frame with door seat portions embraced by outwardly projecting flanges which are adapted to serve as sealing means and are disposed at the sides and along the lower edge of the lading discharge opening, a plurality of spaced hinge lugs being disposed on opposite sides of the said opening in alinement with the flanges respectively adjacent thereto, and the said hinge lugs being integrally united to the adjacent flanges outwardly of the plane of the door seat portions of the frame.

Another feature of the invention consists in forming the opposite sides of the frame with inwardly extending flanges for attachment of hopper side sheets and with brackets projecting laterally from said flanges to provide means of attachment to the car frame, the flanges being divergent upwardly and each having relatively inclined portions, and the brackets being integrally united to the flanges respectively adjacent thereto substantially at the junction of the inclined portions.

Other features of the invention relating to combinations of parts and advantageous details of construction will appear and be particularly pointed out in the claims.

In the drawings illustrating a preferred embodiment of the invention:

Figure 1:
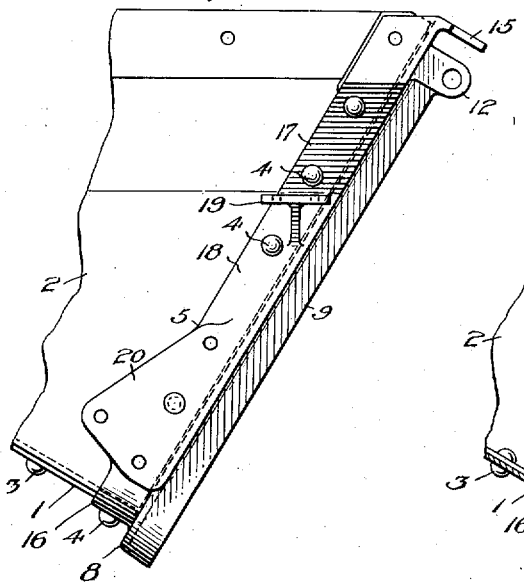
Figure 1 is a side elevational view of a portion of a railway car hopper having a door frame embodying the invention applied thereto, the door being omitted.
Figure 2:
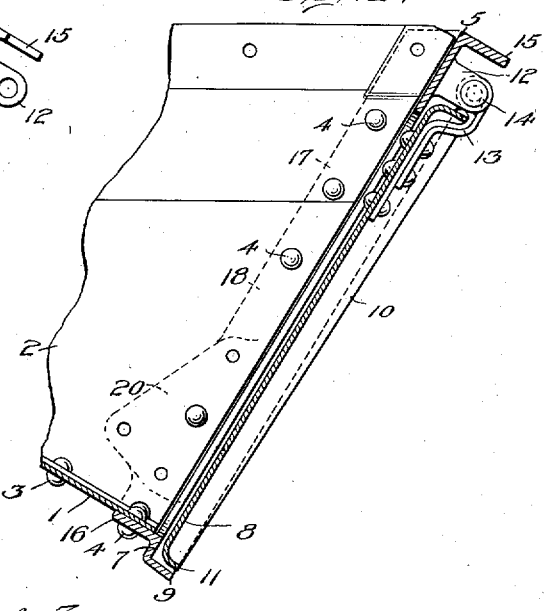
Figure 2 is a vertical sectional view of the construction shown in Fig. 1, illustrating the relation of the door to the door frame when the door is shut.

For the purpose of illustrating the invention a well known form of hopper has been shown. It comprises an inclined bottom or chute plate 1 and downwardly converging side sheets 2 bent along their lower edges to provide inwardly extending flanges which overlap the neighboring edge of the chute plate 1. The side sheets 2 are secured to the plate 1 by rivets 3 in the usual manner.

Secured to the bottom plate 1 and side plates 2 at the discharge end of the hopper, as by means of rivets 4, is a door frame 5 which is preferably made of cast steel. The lading discharge opening 6 of the frame is preferably rectangular and centrally located. At the sides and along the lower edge of this opening are door seat portions 7 which are overlapped by the door 8 when the latter is in closed position. The door is preferably of the sheet metal type. Bordering the door seats 7 and in spaced relation to the margins of the lading discharge opening are outwardly projecting flanges 9 positioned so as to be in close proximity to corresponding outwardly projecting side flanges 10 and bottom flange 11 of the door. These flanges upon the door and frame cooperate to prevent loss of fine lading.

Above the door opening the frame is provided with a plurality of pairs of hinge lugs 12 to which the hinge members 13 of the door are secured by hinge pins 14. The outer one of each pair of hinge lugs is preferably disposed in alinement with the adjacent flange 9 at the side of the lading discharge opening, and said flanges and corresponding lugs are integrally united, thereby reinforcing these lugs outwardly of the plane of the door seats 7.

Figure 3:
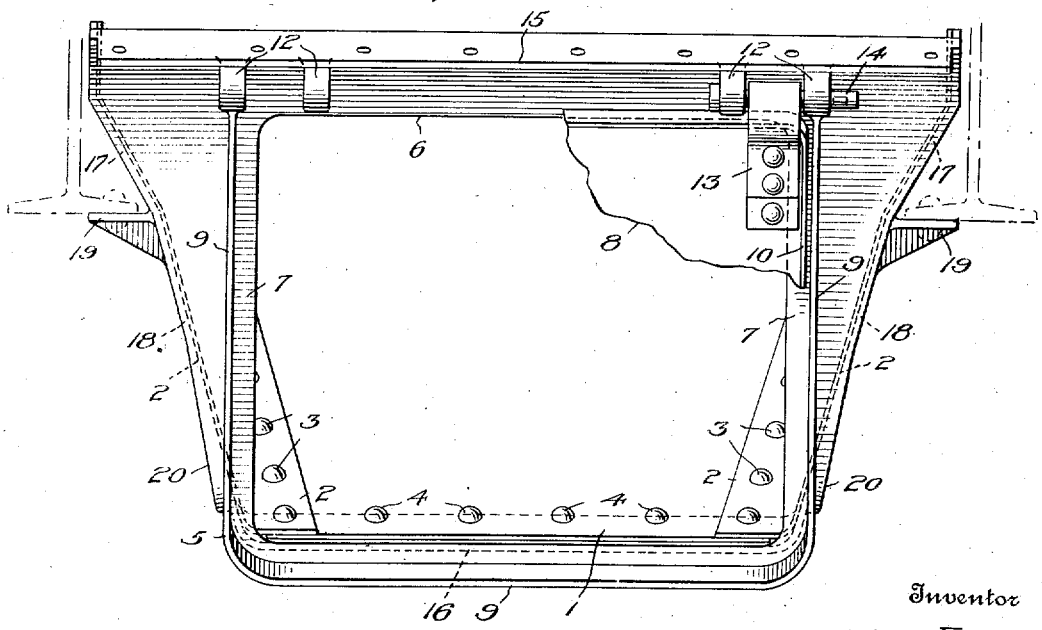
Figure 3 is an end elevational view of the construction shown in Fig. 2, a portion of the door being broken away.

The frame is preferably of substantially trapezoidal form and may advantageously be fashioned at its upper end with an outwardly projecting flange 15 serving to permit the frame to be secured at its upper end to a neighboring part of the car body. Extending inwardly from the upper edge of the door seat portion 7 which is below the discharge opening, is an attaching flange 16 to which the lower end of the chute plate 1 of the hopper is secured by the rivets 4. This flange, which forms an integral part of the frame, merges into inwardly extending upwardly divergent flanges to which the side sheets 2 of the hopper are riveted, each of said side flanges being preferably formed of relatively inclined portions 17 and 18, respectively. At the junction of these angularly disposed portions of the side flanges are laterally projecting integrally attached brackets 19 which, as illustrated in Fig. 3, provide means of attachment to adjacent parts of the car frame. If desired, the side flanges of the frame may be fashioned near their lower ends with suitable enlargements 20 constituting base plates for the mounting of door locking means.

Although, as may be readily perceived from the drawings the frame and hopper construction are symmetrical so as to eliminate "rights" and "lefts" it is to be understood that the invention is not limited in this respect; that is to say, certain changes or modifications can be made in the frame which may destroy its symmetry but will not impair its utility or affect the advantages and benefits to be derived from its use. Thus, if desired, the frame may be provided with only one bracket 19 and only one enlargement 20 as in some types of cars it will be found that, after the frame is applied, these parts will be without utility.

A door frame embodying the invention is well reinforced against rough usage, effectively rigidifies the discharge end of the hopper, cooperates with the door to prevent loss of fine lading, and well protects the door against distortion and injury.

I claim:

1. In a railway car, the combination with a hopper having side sheets and an inclined floor sheet, of an integral door frame rigidly secured to the hopper side sheets and floor sheet in a position forming an angle with the vertical, said frame having a lading discharge opening and being formed with door seat portions bordering the sides and lower edge of said opening and with sealing flanges projecting outwardly from said seat portions in spaced relation to said opening.

2. In a railway car, the combination with a hopper having side sheets and an inclined floor sheet, of a door frame having a lading discharge opening rigidly secured to the hopper sheets, the portion of the frame above said opening being adapted to be secured to a neighboring part of the car, door seat portions bordering the sides and lower edge of said opening, and flanges projecting outwardly from said seat portions in spaced relation to said opening, said flanges being adapted to cooperate with adjacent portions of a door for closing the opening whereby escape of lading from the hopper is prevented.

3. A hopper car door frame having a lading discharge opening, door seat portions bordering the sides and lower edge of said opening, sealing flanges projecting outwardly from said seat portions in spaced relation to said opening, and a plurality of spaced hinge lugs disposed on opposite sides of said opening in alinement with said sealing flanges respectively adjacent thereto, said hinge lugs being integrally united to the adjacent sealing flanges outwardly of the plane of said seat portions.

4. A hopper car door frame having a lading discharge opening, door seat portions bordering the sides and lower edge of said opening, sealing flanges projecting outwardly from said seat portions in spaced relation to said opening, and a flange adapted to overlap and be secured to a portion of the car hopper, said last-named flange extending inwardly from the upper edge of said seat portion which is below the discharge opening and being integrally united to said portion.

5. A door frame having a lading discharge opening and adapted to be applied as a unit to the hopper of a railway car, the portion of the frame above said opening being adapted to be secured to a neighboring part of the car, lugs rigid with said portion for hingedly associating a door with the frame for closing said opening, door seat portions bordering the sides and the lower edge of said opening, and flanges adapted to serve as sealing means against the escape of lading projecting outwardly from said seat portions in spaced relation to said opening, and a flange adapted to overlap and be secured to a portion of the car hopper, said last-named flange extending inwardly from the upper edge of said seat portion which is below the discharge opening and being integrally united to said portion.

6. A hopper car door frame having a lading discharge opening and provided at its opposite sides with inwardly extending flanges for attaching the side sheets of a car hopper to the frame, one of said flanges being provided with a laterally projecting bracket adapted to be secured to an adjacent part of the car body.

7. A hopper car door frame having a lading discharge opening and provided at its opposite sides with inwardly extending portions for attaching the side sheets of a car hopper to the frame, bracket means rigid with one of said portions and having a substantially horizontal laterally extending flange for attachment to an adjacent part of the car body.

8. A hopper car door frame having a lading discharge opening and provided at its opposite sides with inwardly projecting portions for attaching the side sheets of the car hopper to the frame, and means rigid with said frame and projecting laterally from one of said portions involving a flange adapted to be rigidly secured to an adjacent part of the car body.

9. A hopper car door frame having a lading discharge opening and provided at its opposite sides with inwardly projection portions for attaching the side sheets of the car hopper to the frame, one of said flanges being rigidly provided with laterally projecting means comprising a plurality of angularly disposed portions, one of said portions being adapted to be rigidly secured to an adjacent part of the car body.

10. A hopper car door frame having a lading discharge opening and provided at its opposite sides with inwardly projecting portions for attaching the side sheets of the car hopper to the frame, one of said flanges being integrally formed with a laterally projecting bracket, said bracket having a portion adapted to be disposed in a substantially horizontal plane for attachment to an adjacent part of the car body.

11. A hopper car door frame having a lading discharge opening and provided at its opposite sides with inwardly projecting portions for attaching the side sheets of the car hopper to the frame, one of said flanges having relatively inclined portions, and a bracket rigid with said last-named flange and projecting laterally thereof adjacent the junction of its inclined portions, said bracket being adapted to be secured to an adjacent part of the car body.

12. A hopper car door frame having a lading discharge opening and provided at its opposite sides with inwardly projecting portions for attaching the side sheets of the car hopper to the frame, one of said flanges having relatively inclined portions, and means rigid with said last-named flange and disposed adjacent the junction of the inclined portions thereof, said means involving a portion adapted to be disposed in a substantially horizontal plane for attachment to an adjacent part of the car body.

13. A hopper car door frame having a lading discharge opening and provided at its opposite sides with inwardly projecting portions for attaching the side sheets of the car hopper to the frame, one of said flanges having relatively inclined portions, and a bracket integrally formed with said last-named flange and projecting laterally thereof adjacent the junction of said inclined portions for attachment to a neighboring part of the car body.

14. A hopper car door frame having a lading discharge opening and provided at its opposite sides with inwardly extending flanges having brackets projecting laterally therefrom, said flanges being divergent upwardly and each comprising relatively inclined portions, and said brackets being integrally united to the flanges respectively adjacent thereto substantially at the junction of said inclined portions.

15. A door frame having a lading discharge opening and adapted to be applied as a unit to the hopper of a railway car, the portion of the frame above said opening being adapted to be secured to a neighboring part of the car and being provided with hinge lugs, door seat portions bordering the sides and lower edge of said opening, and flanges projecting outwardly from said seat portions in spaced relation to said opening, in combination with a door hingedly connected to said lugs for closing the opening of the frame, said door being adapted to overlap said seat portions and having outwardly extending flanges for cooperating with the flanges of the frame to form a seal therewith for preventing the escape of lading from the hopper.

16. A hopper car door frame having a rectangular lading discharge opening, inwardly extending downwardly converging flanges for attaching the side sheets of a car hopper to the frame, the portion of the frame between one of said flanges and the adjacent edge of said opening being of substantially triangular shape, door seat portions bordering the sides and lower edge of said opening, and flanges projecting outwardly from said seat portions in spaced relation to said opening, in combination with a hingedly mounted door for closing the opening of the frame, said door being adapted to overlap said seat portions and having flanges for cooperating with the outwardly projecting flanges of the frame to form a seal therewith for preventing the escape of lading from the hopper.

17. A hopper car door frame having a lading discharge opening, the portion of the frame intermediate one side edge of the opening and the adjacent side edge of the frame being of substantially triangular shape, door seat portions bordering the sides and lower edge of said opening, flanges projecting outwardly from said seat portions in spaced relation to said opening, and a flange adapted to overlap and be secured to a portion of the car hopper, said last-named flange extending inwardly from the upper edge of said seat portion which is below the discharge opening and being integrally united to said portion.

18. A hopper car door frame having a lading discharge opening, downwardly converging inwardly extending flanges for attaching the side sheets of a car hopper to the frame, door seat portions bordering the sides and lower edge of said opening, flanges projecting outwardly from said seat portions in spaced relation to said opening, one of said last-named flanges being disposed intermediate a side edge of the opening and the adjacent side sheet attaching flange, in combination with a hinged door for closing said opening, the door being adapted to overlap said seat portions and having flanges for cooperating with the outwardly extending flanges of the frame to form a seal therewith for preventing the escape of lading from the car.

19. A hopper car door frame having a lading discharge opening, door seat portions bordering the sides and lower edge of said opening, and outwardly projecting sealing flanges spaced from said opening, in combination with a hinged door for closing said opening, the door being adapted to overlap said seat portions and having outwardly extending sealing flanges for cooperating with the said sealing flanges of the frame.

20. A hopper car door frame having a lading discharge opening and adapted to be applied as a unit to the hopper of a railway car, the portion of the frame above said opening being flanged and being adapted to be secured to a neighboring part of the car body, hinge lugs rigid with said portion, door seat portions bordering the sides and lower edge of said opening, and outwardly projecting sealing flanges spaced from said opening, in combination with a door hingedly connected to said lugs for closing said opening, said door being adapted to overlap said seat portions and having outwardly extending flanges for cooperating with the flanges of the frame to form a seal therewith for preventing the escape of lading from the hopper.

21. A door frame having a lading discharge opening and adapted to be applied as a unit to the hopper of a railway car, the portion of the frame above said opening being flanged and integrally formed with hinge lugs, door seat portions bordering the sides and lower edge of said opening, and outwardly projecting flanges spaced from said opening, in combination with a door hingedly connected to said lugs for closing said opening, said door being adapted to overlap said seat portions and having outwardly extending flanges for cooperating with the flanges of the frame to form a seal therewith for preventing the escape of lading from the hopper.

WILLIAM E. WINE.